J. V. MARTIN.
AIRCRAFT STRUCTURE.
APPLICATION FILED MAY 31, 1916. RENEWED OCT. 1, 1917.
1,277,979.
Patented Sept. 3, 1918.
2 SHEETS—SHEET 1.
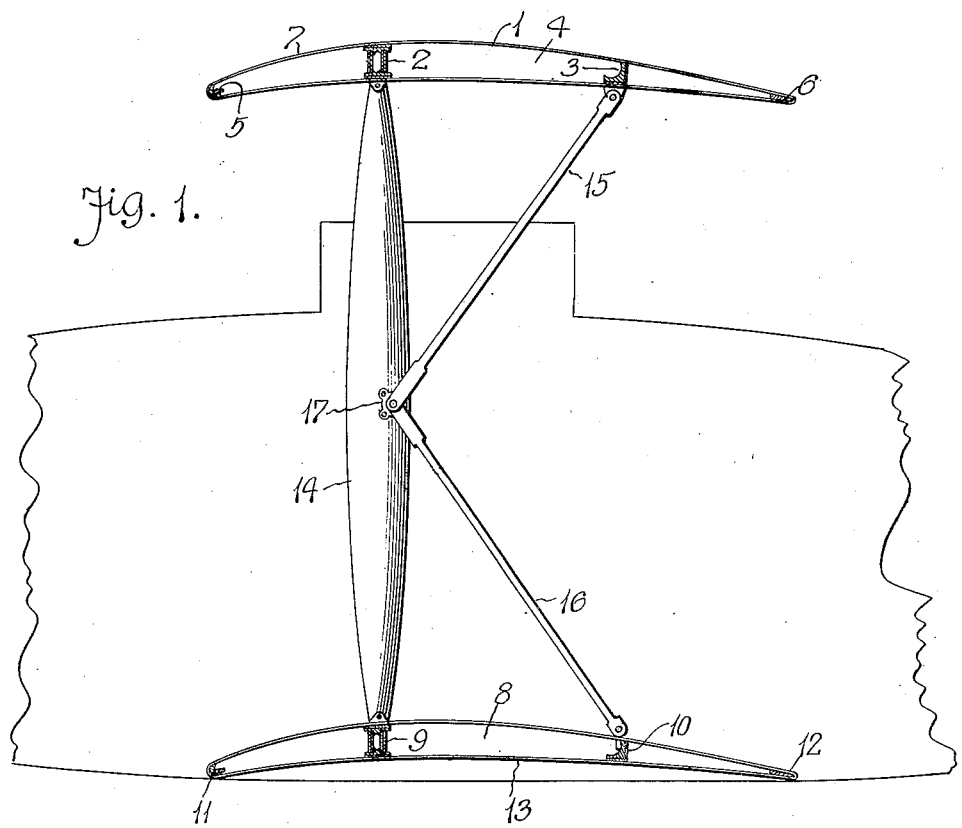
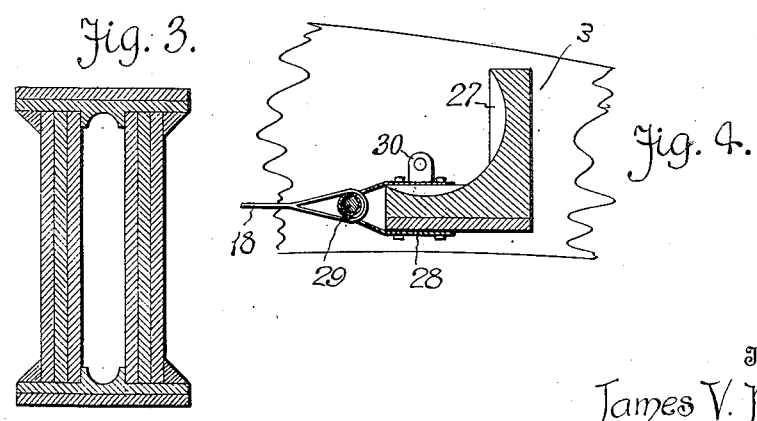
Witness
Chas. W. Stauffiger
Charles Baly
Inventor
James V. Martin.
By Barthel & Barthel
Attorneys

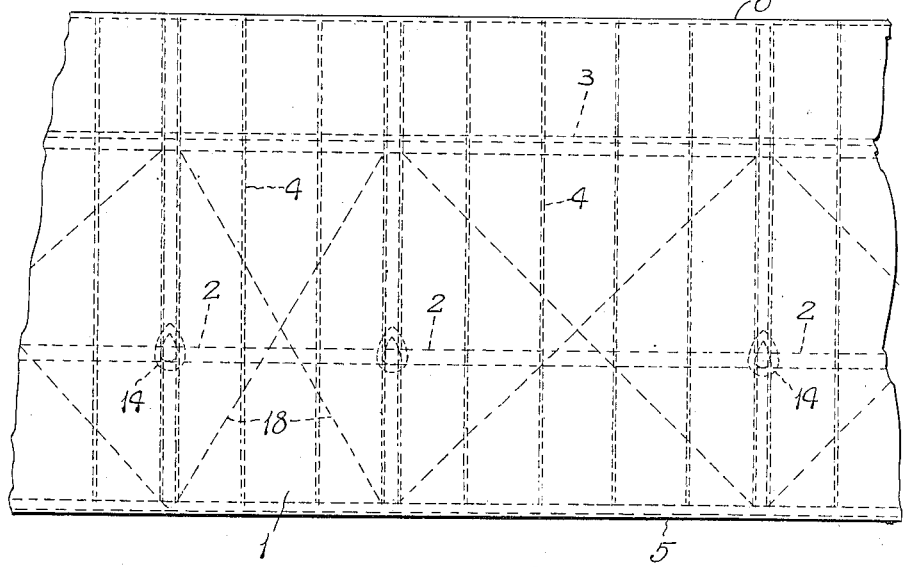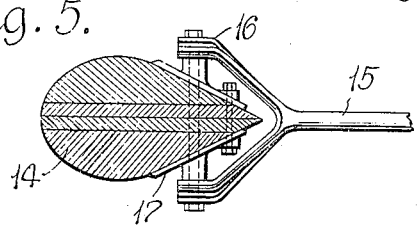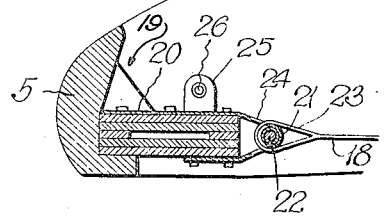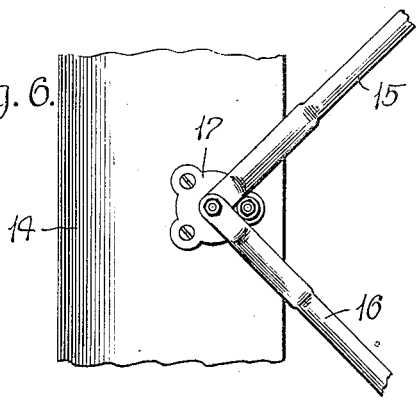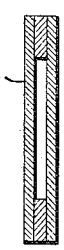

UNITED STATES PATENT OFFICE.

JAMES V. MARTIN, OF DETROIT, MICHIGAN.

AIRCRAFT STRUCTURE.

1,277,979.	Specification of Letters Patent.	Patented Sept. 3, 1918.

Application filed May 31, 1916, Serial No. 100,799. Renewed October 1, 1917. Serial No. 194,280.

*To all whom it may concern:*

Be it known that I, JAMES V. MARTIN, a citizen of the United States of America, residing at Detroit, in the county of Wayne and State of Michigan, have invented certain new and useful Improvements in Aircraft Structure, of which the following is a specification, reference being had therein to the accompanying drawings.

This invention relates to aeroplane construction and more particularly to the cellule stresses of biplanes or triplanes and to a disposition of the members so that the head resistance is materially reduced, thus adding greatly to the efficiency of all superposed aerofoils. The invention also includes an arrangement to concentrate the points of stress and to truss the planes at substantially the centers of pressure in a more direct manner than is practical under the present double strut system of trussing. A further feature is the removal of the "drag" wires from their position between the superposed wings which leaves them exposed and to place or substitute within the wings a system of trussing that more directly counteracts the strain and offers no resistance to the aeroplane's progression. A further object of the invention is to attach stay members to a single strut member so that the compression of one tending to buckle the strut will be counteracted by the action of the other stay, and the strut will escape such oblique strains.

The invention consists in the matters hereinafter set forth, and more particularly pointed out in the appended claims.

In the drawings,

Figure 1 is a view in side-elevation and section representing superposed planes provided with the single strut system of bracing which embodies features of the invention;

Fig. 2 is a plan view partly broken away, and largely diagrammatic, of one of the wings of a plane;

Fig. 3 is a view in detail and in section of a preferred form of center wing bar;

Fig. 4 is a view in section of a rear wing bar;

Fig. 5 is a view in section of a strut;

Fig. 6 is a view in detail showing the connection between the struts and braces;

Fig. 7 is a view in detail and in section of a leading or front edge bar and connection for the drift wires; and Fig. 8 is a view in section of a rib.

As herein shown, an upper plane 1 is formed of a center wing bar 2 and a rear wing bar 3 held in spaced relation by ribs 4, the forward extremities of which are connected by a front edge bar 5 while the rear portions are secured to a rear edge bar 6, an envelop or skin 7 covering the framework, the desired cross sectional contour being given by the design of the ribs 4. The center wing bar 2 is designed particularly to resist the lift stresses, and is preferably of the laminated box type indicated. Preferably it is situated with its forward edge at substantially the most forward center of pressure of the wing section so that the mean center of pressure will always lie very close to it and never forward of it.

A lower plane 8 has a center wing bar 9 similar in general construction to the wing bar 2 of the upper plane, designed for vertical stress but lighter than the upper bar 2 as it carries less load. A rear wing bar 10, front edge member 11, trailing bar 12 and envelop 13 completes the lower wing.

Struts 14 connect the wing bars 2 and 9. Each of these struts is preferably formed of laminations lying in planes parallel to the ribs of the wing with its outer proportions and contour designed both for compression and bending stress and for minimum wind resistance, the laminations strengthening the member against any buckling tendency due to the combined fore and aft compression and bending stress. An upper brace 15 and lower brace 16 connect the upper rear wing bar 3 and the lower wing bar with the strut at approximately the center of the latter, a fixture 17 of suitable form to embrace the rear portion of the strut and to afford both connections with the forked portions of the braces, providing the desired union without any weakening of the strut. The braces are adapted to resist both compression and tension stresses.

Preferably the forward or leading edge bar 4 of the upper wing and corresponding member 12 of the lower plane have the section indicated in Fig. 7 to resist strains parallel to the direction of flight. Cables or wires 18 for trussing the drift stresses, are diagonally disposed between the wing members as indicated, preferably being secured to the front edge bar by a suitable fitting 19 which likewise forms a corner brace and connection with the adjacent rib.

As herein shown such fitting includes a pair of plates 20 whose overlapped and inrolled outer portions 21 envelop a holding member or bolt 22, the looped end portions 23 of the braces 18 being passed through apertures 24 of the plates and around the bolt. The upper plate has an upturned ear 25 which affords means for the connection with the rib by a bolt 26 or the like. The cross sectional contour of the rear wing bar 3 or its counterpart 10 of the lower plane is indicated in Fig. 4 in preferred design, there being fillers 27 at the points of the connection of the diagonals 18 with a suitable fitting 28 carrying a forward inrolled rivet or bolt member 29 for the loop connection with the diagonals, and a bolt ear 30 for anchoring to the adjacent rib. The webs of the ribs are apertured if desired to combine strength and lightness, and to give clearance for the diagonals 18.

As a result of this construction an aeroplane is formed that presents minimum head resistance due to the envelopment of a large portion of the trussing system within the bodies of the respective wings while the absence of the usual rear strut further minimizes the resistance to forward motion.

Obviously, changes in the details of construction may be made without departing from the spirit of my invention and I do not care to limit myself to any particular form or arrangement of parts.

What I claim is:—

1. In an air-craft, superposed wings each having a center wing bar adapted to take lift stresses only and a rear wing bar adapted to take drift stresses, struts connecting the central wing bars and a pair of stays for each strut having a common connection therewith and connected to said rear wing bars, said stays being each adapted to withstand both tension and compression.

2. In a tractor biplane, a strut forming the sole direct connection between the planes and having tension and compression stays running from a common connection with the central portion of said strut to the wings.

3. In a tractor biplane, a strut spacing the central wing bar of each wing from the central wing bar of the other wing, and rigid stay rods having a common connection with the control portion of said strut and connecting respectively, one with the rear part of the upper wing and one with the rear part of the lower wing.

4. In an aeroplane, having superposed planes, a single row of struts between said planes, a fitting secured to the central portion of each strut, and a plurality of rigid stay rods connected to each fitting at one end and attached at their opposite ends to the upper and lower wings at the rear portions thereof.

5. In an aeroplane having superposed aerofoils each provided with a leading edge bar, a trailing edge bar, a central wing bar designed to resist greater lift than drift stresses and postioned approximately at the most forward center of pressure, a rear wing bar designed to resist greater drift than lift stresses and compression ribs connecting said bars, diagonal wires to truss drift stresses connecting the leading edge bar with the rear wing bars of each aerofoil, a single row of struts directly connected at their ends to and holding the central wing bars in spaced relation, and brace members having a common connection with the central portion of each strut and attached to the rear wing bars, said brace members each forming a tension and compression member.

6. In an aeroplane, an aerofoil having a central wing bar at approximately the forward center of pressure and designed to take lift stresses only, a leading edge bar, a rear wing bar designed to resist greater drift than lift stresses, and trussing connecting the leading edge bar and the rear wing bar to truss drift stresses independently of lift stresses.

In testimony whereof I affix my signature in the presence of two witnesses.

JAMES V. MARTIN.

Witnesses:
ANNA M. DORR,
C. R. STICKNEY.